(12) United States Patent
Zhang et al.

(10) Patent No.: US 9,641,074 B2
(45) Date of Patent: May 2, 2017

(54) CURRENT CONTROL FOR DC-DC CONVERTER

(71) Applicant: BCD Semiconductor Manufacturing Limited, Shanghai (CN)

(72) Inventors: Hongbo Zhang, Shanghai (CN); Hongyue Du, Shanghai (CN); Wei Zhang, Shanghai (CN); Chao Chen, Shanghai (CN); Yong Zhao, Shanghai (CN)

(73) Assignee: BCD Semiconductor Manufacturing Co., Ltd., Shanghai (CN)

( * ) Notice: Subject to any disclaimer, the term of this patent is extended or adjusted under 35 U.S.C. 154(b) by 909 days.

(21) Appl. No.: 13/837,277

(22) Filed: Mar. 15, 2013

(65) Prior Publication Data

US 2013/0257400 A1   Oct. 3, 2013

(30) Foreign Application Priority Data

Mar. 30, 2012   (CN) .......................... 2012 1 0090980

(51) Int. Cl.
*H02M 3/158*   (2006.01)
*H02M 3/156*   (2006.01)
*H02M 1/00*    (2006.01)

(52) U.S. Cl.
CPC .......... *H02M 3/158* (2013.01); *H02M 3/156* (2013.01); *H02M 2001/0009* (2013.01); *H02M 2001/0025* (2013.01)

(58) Field of Classification Search
CPC .. H02M 3/156; H02M 3/1563; H02M 3/1566; H02M 3/257; H02M 3/158; H02M 3/1588; H02M 2001/0009; H02M 2001/0016; H02M 2001/0019; H02M 2001/0025; H02M 1/32; H02M 3/157;
(Continued)

(56) References Cited

U.S. PATENT DOCUMENTS 6,498,466 B1 * 12/2002 Edwards ........... H02M 3/33507
                                                        323/282
2005/0135036 A1 * 6/2005 Kanamori ............. H02M 3/156
                                                        361/93.1

(Continued)

OTHER PUBLICATIONS

H. P. Forghani-zadeh and G. A. Rincon-Mora, "Current-sensing techniques for DC-DC converters," Circuits and Systems, 2002. MWSCAS-2002. The 2002 45th Midwest Symposium on, 2002, pp. II-577-II-580 vol. 2.*

*Primary Examiner* — Timothy J Dole
*Assistant Examiner* — Ivan Laboy Andino

(57) ABSTRACT

A current control circuit includes an input circuit for receiving an input signal, an output circuit for providing an output signal. The output circuit is coupled to the input circuit to receive a current therefrom. The current control circuit also includes a feedback circuit coupled to the input circuit and the output circuit to form a feedback loop. The current control circuit further includes a first slope compensation current coupled to the output circuit for controlling the output signal, the first slope compensation current being a periodic current. The current control circuit also includes a second slope compensation current coupled to the feedback circuit, wherein the second slope compensation current has the same phase and period as the first slope compensation current.

17 Claims, 7 Drawing Sheets

(58) Field of Classification Search
CPC ..... G05F 1/10; G05F 1/46; G05F 1/56; G05F 1/561; G05F 1/562; G05F 1/565; G05F 1/569; G05F 1/573; G05F 1/575; G05F 1/5735; H02H 3/08; H02H 3/087; H02H 9/02; H02H 9/025
USPC ........ 323/222–226, 265, 271–276, 278, 280, 323/282–290, 303, 311–317, 351, 908; 327/131–140, 538–543; 361/18, 93.1, 361/93.7, 93.9; 363/50, 56.03, 56.07, 363/56.1, 78, 79
See application file for complete search history.

(56) References Cited

U.S. PATENT DOCUMENTS

| | | | |
|---|---|---|---|
| 2008/0150508 A1* | 6/2008 | Sohma | H02M 3/156 323/283 |
| 2009/0080227 A1* | 3/2009 | Nakahashi | H02M 3/156 363/80 |
| 2010/0253309 A1* | 10/2010 | Xi | H02M 3/156 323/288 |
| 2010/0320974 A1* | 12/2010 | Manlove | H02M 3/157 323/222 |
| 2011/0241641 A1* | 10/2011 | Chen | H02M 3/1588 323/284 |

* cited by examiner

CURRENT CONTROL FOR DC-DC CONVERTER

CROSS-REFERENCES TO RELATED APPLICATIONS

This application claims priority to Chinese Patent Application No. 201210090980.X, filed Mar. 30, 2012, commonly owned and incorporated in its entirety by reference herein for all purposes.

BACKGROUND OF THE INVENTION

The present invention is generally related to DC-DC converter technology. More particularly, the present invention provides methods and circuits for current control circuits that can be used in a DC-DC converter and other applications.

A DC-to-DC converter is a circuit for converting a direct current (DC) from one voltage level to another. It is a class of power converter. Linear regulators can only output at lower voltages from the input. Switch-mode DC to DC converters convert one DC voltage level to another, by storing the input energy temporarily and then releasing that energy to the output at a different voltage. Switch-mode DC to DC converters can convert an input voltage to a lower or higher output voltage, and they are more efficient than the linear regulators.

A DC-DC converter often includes a current sense circuit for providing a current sense signal as a feedback signal representing a current flow in the inductive coil. The current sense signal is compared with a reference signal for controlling the operation of the converter. A slope compensation circuit is often provided in conventional current-mode controlled DC-DC converters. The output of the slope compensation circuit is used for changing the slope at which a reference signal intersects with a current sense signal. Thus, the slope compensation circuit outputs a slope compensation signal superimposed on the current sense signal, which is used as a control parameter.

In some convention converters, the slope compensation signal is often formed by transforming an oscillation signal and then superimposing it on the current sense signal. However, the oscillation signal is referenced to a ground signal when being generated.

Even though conventional slope compensation circuits have been used to maintain stability of DC-DC converters, they often have limitations. Some of the limitations are described below in more details. Therefore, improved techniques for providing slope compensation signals are highly desirable.

BRIEF SUMMARY OF THE INVENTION

The present invention is generally related to DC-DC converter technology. More particularly, the present invention provides methods and circuits for current control circuits that can be used in a DC-DC converter and other applications. Merely by way of example, embodiments of the invention are applied to a current limiting circuit for a DC-DC converter to reduce output current overshoot that may be caused by a slope compensation current. The methods and circuits can be used in motor drive circuits. But it would be recognized that the invention has a much broader range of applicability.

According to some embodiments of the invention, a current control circuit includes an input circuit for receiving an input signal, an output circuit coupled to the input circuit to receive a current therefrom, a feedback circuit coupled to the input circuit and the output circuit, and a voltage source coupled to the input circuit and the feedback circuit. The feedback circuit includes a first PMOS transistor and a current source connected in series, and a first NMOS transistor whose gate terminal is coupled to a node between the first PMOS transistor and the current source. The output circuit includes a second PMOS transistor. The input circuit includes a second NMOS transistor, a first resistor and a second resistor connected in series. A node between the first resistor and the second resistor is coupled to the first NMOS transistor of the feedback circuit. The current control circuit also includes a third PMOS transistor forming a first current mirror with the first PMOS transistor and the second PMOS transistor, and a third NMOS transistor and a fourth NMOS transistor forming a second current mirror to receive a current from the third PMOS transistor and providing an output signal of the current control circuit. Moreover, the current control circuit includes a first slope compensation current coupled to a node between the second NMOS transistor and the first resistor in the output circuit, and a second slope compensation current coupled to a node between the first PMOS transistor and the current source of the feedback circuit. The first slope compensation current and the second slope compensation current have the same phase and period, and a sum of the second slope compensation current and a drain current of the first PMOS is greater than a current from the current source.

In some embodiments, the above current control circuit also includes a single slope compensation circuit configured to provide the first slope compensation current and the second slope compensation current. In alternative embodiments, two separate slope compensation circuits are included: a first slope compensation circuit configured to provide the first slope compensation current and a second slope compensation circuit configured to provide the second slope compensation current. In other embodiments, the current control circuit further includes a first switch and a fifth NMOS transistor connected in series and forming a current mirror with the third NMOS transistor, wherein the first switch is configured to be closed when the current control circuit is under testing. In some embodiment, when the first slope compensation current is at a peak value, the second slope compensation current is also at a peak value, and wherein when the first slope compensation current is at a valley value, the second slope compensation current is also at a valley value.

According to another embodiment of the invention, a current control circuit includes an input circuit for receiving an input signal, an output circuit for providing an output signal. The output circuit is coupled to the input circuit to receive a current therefrom. The current control circuit also includes a feedback circuit coupled to the input circuit and the output circuit to form a feedback loop. The current control circuit further includes a first slope compensation current coupled to the output circuit for controlling the output signal, the first slope compensation current being a periodic current. The current control circuit also includes a second slope compensation current coupled to the feedback circuit, wherein the second slope compensation current has the same phase and period as the first slope compensation current.

In some embodiments of the above current control circuit, the first slope compensation current is a periodic current having a period that is shorter than a stabilization time of the feedback loop so as to cause an overshoot in the output signal of the current control signal. In another embodiment, the second slope compensation current has a magnitude selected to prevent overshoot in the output signal. In some embodiments, the feedback circuit includes a first PMOS transistor and a current source connected in series, and a first NMOS transistor whose gate terminal is coupled to a node between the first PMOS transistor and the current source. The output circuit includes a second PMOS transistor. The input circuit includes a second NMOS transistor, a first resistor and a second resistor connected in series. A node between the first resistor and the second resistor is coupled to the first NMOS transistor of the feedback circuit. Further, a sum of the second slope compensation current and a drain current of the first PMOS is greater than a current from the current source. In some embodiments, the current control circuit also includes a first switch and a fifth NMOS transistor connected in series and forming a current mirror with the third NMOS transistor, wherein the first switch is configured to be closed when the current control circuit is under testing. In another embodiment, the current control circuit includes a single slope compensation circuit configured to provide the first slope compensation current and the second slope compensation current. In another embodiment, the current control circuit has two slope compensation circuits: a first slope compensation circuit configured to provide the first slope compensation current and a second slope compensation circuit configured to provide the second slope compensation current.

In alternative embodiments, the present invention provides a DC-DC converter, which includes an input terminal for receiving an input power, an output terminal for coupling to an inductor to provide an output voltage to a load device, a first power transistor coupled to the input terminal and the output terminal, an amplifier for receiving a signal from the load device, a current control circuit coupled to the amplifier, a comparator coupled to the current control circuit and the output terminal, a driver circuit coupled to the comparator and the first power transistor, and a second power transistor coupled between the input terminal and the comparator. The current control circuit includes an input circuit for receiving an input signal, an output circuit for providing an output signal, the output circuit being coupled to the input circuit to receive a current therefrom, a feedback circuit coupled to the input circuit and the output circuit to form a feedback loop, a first slope compensation current coupled to the output circuit for controlling the output signal, the first slope compensation current being a periodic current, and a second slope compensation current coupled to the feedback circuit, wherein the second slope compensation current has the same phase and period as the first slope compensation current.

In some embodiments of the above DC-DC converter, the first slope compensation current is a periodic current having a period that is shorter than a stabilization time of the feedback loop so as to cause an overshoot in the output signal of the current control signal. In some embodiments, the second slope compensation current has a magnitude selected to prevent overshoot in the output signal. In other embodiments, the current control circuit further includes a first slope compensation circuit configured to provide the first slope compensation current and the second slope compensation current. In another embodiment, the current control circuit further includes a first slope compensation circuit configured to provide the first slope compensation current and the second slope compensation current. In another embodiment, the current control circuit further includes a switch configured to reduce an output current when the current control circuit is under testing.

Various additional embodiments, features, and advantages of the present invention can be appreciated with reference to the detailed description and accompanying drawings that follow.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
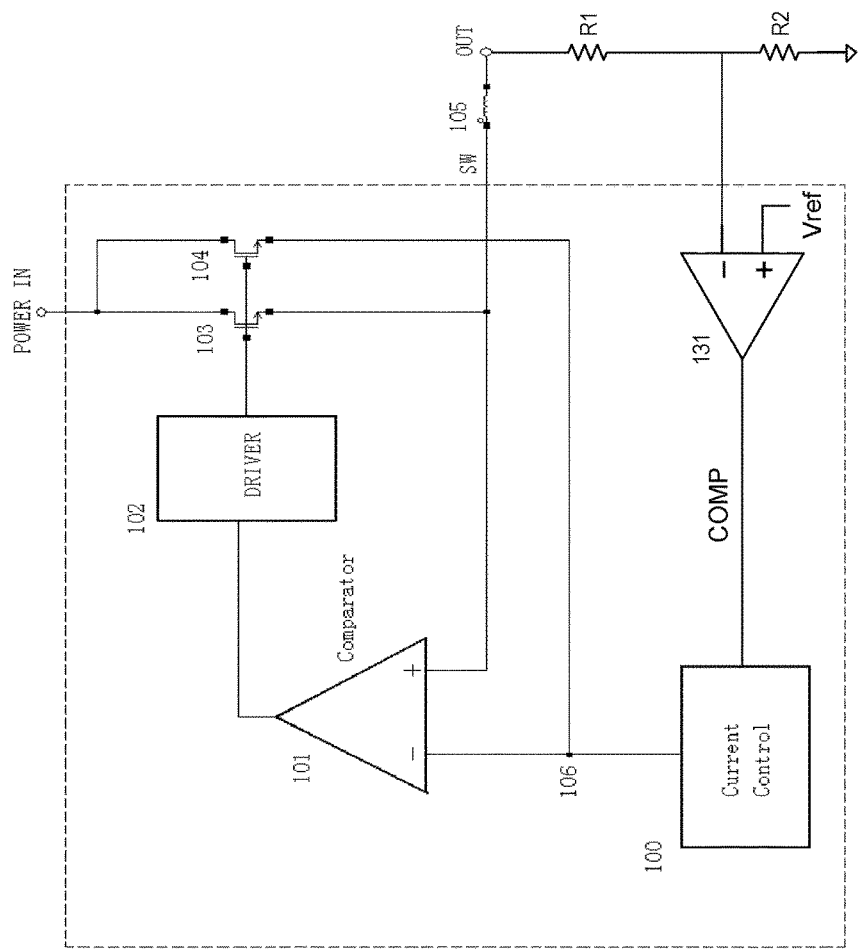
FIG. 1 is a simplified block diagram illustrating a current limiting circuit for a DC-DC converter according to an embodiment of the present invention.

FIG. 1 is a simplified block diagram illustrating a current limiting circuit for a DC-DC converter according to an embodiment of the present invention. The circuit in FIG. 1 includes a current control circuit 100, a comparator 101, a driver circuit 102, a first power transistor 103 and a second power transistor 104, a power source labeled "POWER IN", an amplifier 131, an inductor 105, a first load resistor R1 and a second load resistor R2. As shown, current limit circuit 100 has an output that is coupled to a negative input of comparator 101 and a source terminal of second power transistor 104. An input of current control circuit 100 is connected to a signal COMP from an output of amplifier 131. Amplifier 131 has an input coupled to a reference voltage Vref. The positive input of comparator 101 is coupled to inductor 105 and a source terminal of transistor 103. An output of comparator 101 is coupled to driver 102, which is coupled to a gate of transistor 103. The drain terminals of transistors 103 and 104 are coupled to power source POWER IN. A second terminal of inductor 105 is an output of the circuit OUT. Load resistors R1 and R2 are connected in series between output OUT and ground.

With a conventional current control circuit, the current limiting circuit in FIG. 1 may suffer from current overshoot. For example, when the output OUT is shorted to ground, the voltage at the negative input of amplifier 131 is low, and the input at the positive input of amplifier 131 is still maintained at the reference voltage, amplifier 131 will output a large voltage at its output COMP. A large instantaneous current may exit in current control circuit 100 and the voltage at node 106 becomes low, causing a large output at comparator 101. As a result, transistors 103 and 104 are turned on, causing current overshoot at inductor 105. This overshoot current can cause error signals at the load, and can even damage the load.

Embodiments of the present invention provide methods and circuits for improved current control circuit. Using current control circuit 100 according to embodiments of the present invention, the instantaneous large current can be avoided. As a result, current overshoot at inductor 105 can be prevented.

Figure 2:
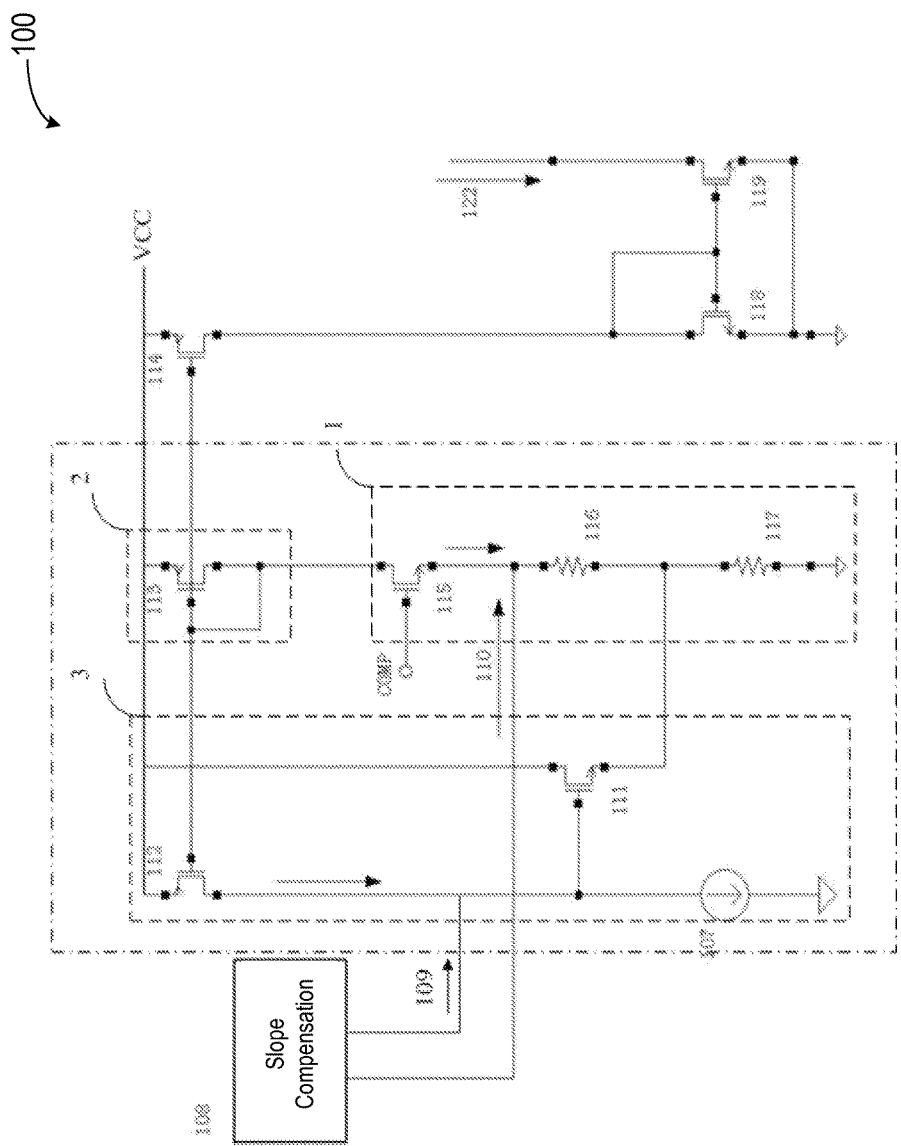
FIG. 2 is a simplified circuit diagram of a current control circuit 100 according to an embodiment of the present invention.

FIG. 2 is a simplified circuit diagram of a current control circuit 100 according to an embodiment of the present invention. In some embodiments, current control circuit 100 of FIG. 2 is used as the current control circuit block in FIG. 1. As shown in FIG. 2, current control circuit 100 includes an input circuit 1, an output circuit 2, a feedback circuit 3, a voltage source VCC, and a first slope compensation circuit 108. Feedback circuit 3 includes a current source 107, a first NMOS transistor 111 and a first PMOS transistor 112. Output circuit 2 includes a second PMOS transistor 113. Input circuit 1 includes a second NMOS transistor 115, a first resistor 116 and a second resistor 117. Current control circuit 100 also includes a third PMOS transistor 114, a third NMOS transistor 118, and a fourth NMOS transistor 119.

As shown in FIG. 2, PMOS transistors 112, 113, and 114 form a first current mirror. NMOS transistor 118 and 119 form a second current mirror. Through these current mirrors, PMOS transistors 113 and 114 and NMOS transistors 118 and 119 control current 122 at the source terminal of transistor 119. Current 122 is the output current of current control module 100. In FIG. 1, current 122 from current control module 100 is coupled to comparator 101. PMOS transistors 112 and 113, NMOS transistors 111 and 115, resistors 116 and 117, and current source 107 form a negative feedback loop.

Current control circuit 100 also includes are first slope compensation current 110 and second slope compensation current 109. In FIG. 2, current source 107 is coupled to second compensation current 109 and the ground. The gate terminal of second NMOS transistor 115 receives a signal COMP, which is the output signal of amplifier 131 in FIG. 1. The source terminal of 115 is coupled to first compensation current 110 and first resistor 116 which is connected to ground through second resistor 117. Transistor 114 is coupled to transistor 118.

A slope compensation circuit is often used a control circuit to compensate for changes in operating conditions. For example, when the supply voltage changes, a slope compensation current can be provided to alter the slope of a control pulse signal. In this case, the slope compensation circuit may monitor the operating condition, such as power supply, output voltage, and target voltage, etc., and provide the slope compensation current as needed. In some embodiments, the slope compensation current can be a periodic signal, and in a specific embodiment, it having a sawtooth shaped waveform. However, the slope compensation circuit can also cause unintended consequences. For example, in conventional circuits, the current control circuit may have only one slope compensation current, which can lead to undesirable results, as described below.

When input signal COMP at the gate terminal of transistor 115 is higher than a certain threshold value, and when the slope first compensation current 110 is at a peak, a voltage drop on resistors 116 and 117 is increased. As a result, the currents in NMOS transistor 115 and PMOS transistor 113 reach a valley. At this time, the drain current of PMOS transistors 112 is greater than the current in current source 107. Transistor 111 is turned off, because its gate voltage is low. On the other hand, when the slope first compensation current 110 is at a peak. At this time, the current in PMOS transistors 112 also reaches a valley, and the drain current of PMOS transistors 112 is less than the current in current source 107. Transistor 111 is turned on. Thus, when voltage COMP rises to a certain voltage, NMOS 111 will be switching between on and off states. The turn on and off of transistor 111 needs a stabilization time. Since the transition time of slope compensation current 110 between peak and valley is faster than the stabilization time of the loop, a large current can appear in NMOS 115 and PMOS 113. As a result, through current mirrors, the current in transistors 114, 118, and 119 can have abnormally large current. An instantaneous large current can appear in current 122.

The current control circuit has many applications, for example, in the current limiting circuit of a DC-DC converter described above in FIG. 1. In a DC-DC converter, a large current from the current control circuit can lead to current overshoot. Such current overshoot can lead to errors in a load integrated circuit, and can even cause damage to the load load integrated circuit.

In embodiments of the present invention, a second slope compensation current is included in the current control circuit. The second slope compensation current is shown as 109 in FIG. 2. In some embodiments, the second slope compensation current has the same period as the first slope compensation current. When a first slope compensation current in the first slope compensation circuit is at a peak value, a current in the second slope compensation circuit is also at a peak value. When a first slope compensation current is at a valley value, a second slope compensation current is at a valley value. Further, a sum of the second slope compensation current and a drain current of the first PMOS 112 is greater than a current from the current source 107. As a result, NMOS transistor 111 stays open, and the negative feedback loop is stable, which also stabilizes output current 122.

As shown in FIG. 2, when input signal COMP at the gate terminal of transistor 115 is higher than a certain value, and when the slope first compensation current 110 is at a peak, the slope second compensation current 109 is also at a peak. Further, a sum of the second slope compensation current and a drain current of the first PMOS 112 is greater than a current from the current source 107. As a result, NMOS transistor 115 is on, because its gate is high. Similarly, when the slope first compensation current 110 is at a valley, the slope second compensation current 109 is also at a valley. The drain current of the first PMOS 112 is at a peak. Further, a sum of the second slope compensation current and a drain current of the first PMOS 112 is greater than a current from the current source 107. As a result, NMOS transistor 115 is on, because its gate is high. Thus, the first slope compensation current and the second slope compensation current are in phase and have the same period. Further, a sum of the second slope compensation current and a drain current of the first PMOS 112 is greater than a current from the current source 107. As a result, NMOS transistor 111 stays open, and the negative feedback loop is stable, which prevents current overshoot at output current 122.

In some embodiments, when slope compensation current 110 reaches a peak, the current in NMOS 115 and PMOS 113 are at a valley. The drain current of PMOS 112, I drain_112, also reaches a valley. If Idrain_112 is less than I_107, then Vg_111 is at a low voltage, causing NMOS 111 to turn off.

Conversely, when slope compensation current 110 reaches a valley, the currents in NMOS 115 and PMOS 113 are at a peak. The drain current of PMOS 112, I drain_112, also reaches a peak. If Idrain_112 is greater than I_107, then Vg_111 is at a high voltage, causing NMOS 111 to turn on. Thus, when voltage COMP rises to a certain voltage, NMOS 111 will be switching between on and off states. Since the transition time of slope compensation current 110 between peak and valley is faster than the stabilization time of the loop, a large current appears in NMOS 15 and PMOS 113. This large current, through PMOS 114 and NMOS 119, affects current 122, causing current to overshoot at inductor 105. If COMP continues to rise, the effect of slope compensation current decreases, and NMOS 111 is in a open state, causing peak current at inductor 105 to stabilized.

When COMP reach a high value, the current in PMOS transistors 112, 113, and 114 are raised, causing Idrain_112 to be greater than current source 107. As a result, the currents in NMOS transistor 115 and PMOS transistors 112 and 113 are lowered. The loop stabilizes, the current in PMOS 113 becomes stable, and current 122 is also stabilized. First NMOS transistor 111 is coupled to voltage source VCC and a node between resistors 116 and 117. The gate terminal of 111 is coupled to a node between current source 107 and transistor 112.

In some embodiments, slope compensation circuit 108 provides current 110, which causes overshoot in the peak current of inductor 105. When the OUT terminal is shorted to the ground, rises slowly. Slope compensation current 110 causes the current in NMOS 115, Isource_115, to ripple, causing ripples in PMOS transistors 112 and 113, which can affect the on-off state of NMOS transistor 111.

In some embodiments, when the OUT terminal is shorted to the ground, and voltage COMP reaches a maximum, causing NMOS 115 current to reach a maximum. Under this condition current 122 also reaches a maximum, and the current at inductor 105 also reaches a maximum. The large current increases difficulty during testing and also raises the risk of burning the integrated circuit chip.

In embodiment of the invention, a second slope compensation current 109 is fed to a node between transistor 112 and current source 107 to suppress current overshoot at inductor 105.

Figure 3:
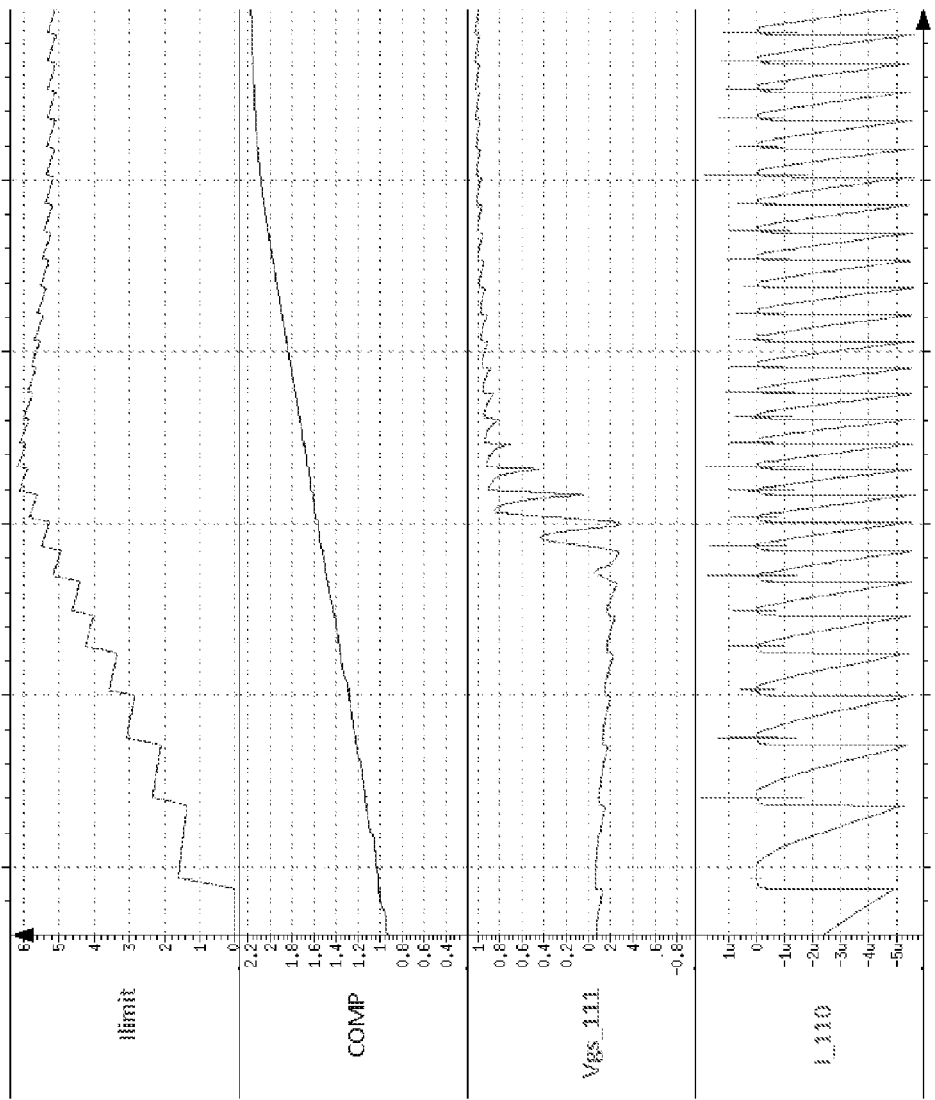
FIG. 3 shows waveform diagrams illustrating various signals in the operation of a conventional current limiting circuit.

FIG. 3 shows waveform diagrams illustrating various signals in the operation of a conventional current limiting circuit. In FIG. 3, Ilimit is the current in inductor 105, COMP is the output voltage of amplifier 131, Vg_111 is the gate voltage of NMOS 111, and I_110 is the first slope compensation current. As shown in FIG. 3, when COMP is greater than certain value and transistor 110 is in transition from off to on, and the first slope compensation current is at peak value, current overshoot occurs at the output at inductor 105. In contrast, no current overshoot occurs in FIG. 4.

Figure 4:
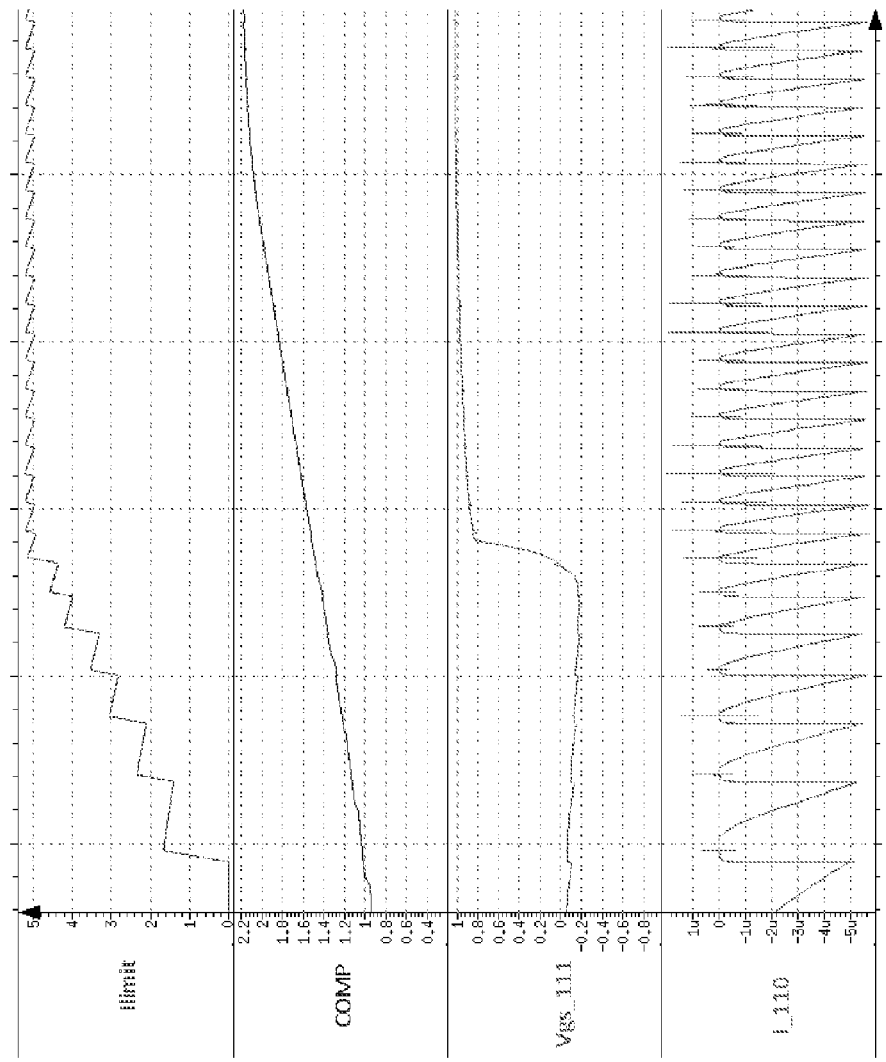
FIG. 4 shows waveform diagrams illustrating various signals in the operation of the current limiting circuit of FIG. 1 and the current control circuit of FIG. 2 according to embodiments of the present invention.

FIG. 4 shows waveform diagrams illustrating various signals in the operation of the current limiting circuit of FIG. 1 and the current control circuit of FIG. 2 according to embodiments of the present invention. In FIG. 4, Ilimit is the current in inductor 105, COMP is the output voltage of amplifier 131, Vg_111 is the gate voltage of NMOS 111, and I_110 is the first slope compensation current. In contrast, no current overshoot occurs in FIG. 4 due to the operation of the current control circuit according to embodiments of the present invention.

Even though the above is an example of using current control circuit 100 to prevent current overshoot in a DC-DC converter, the application is not limited to DC-DC converters. For example, it is often necessary to test the maximum current in the output of inductor 105. If the inductor current is high, the testing requires wider range and higher accuracy. As a result, the cost of testing is increased.

Figure 5:
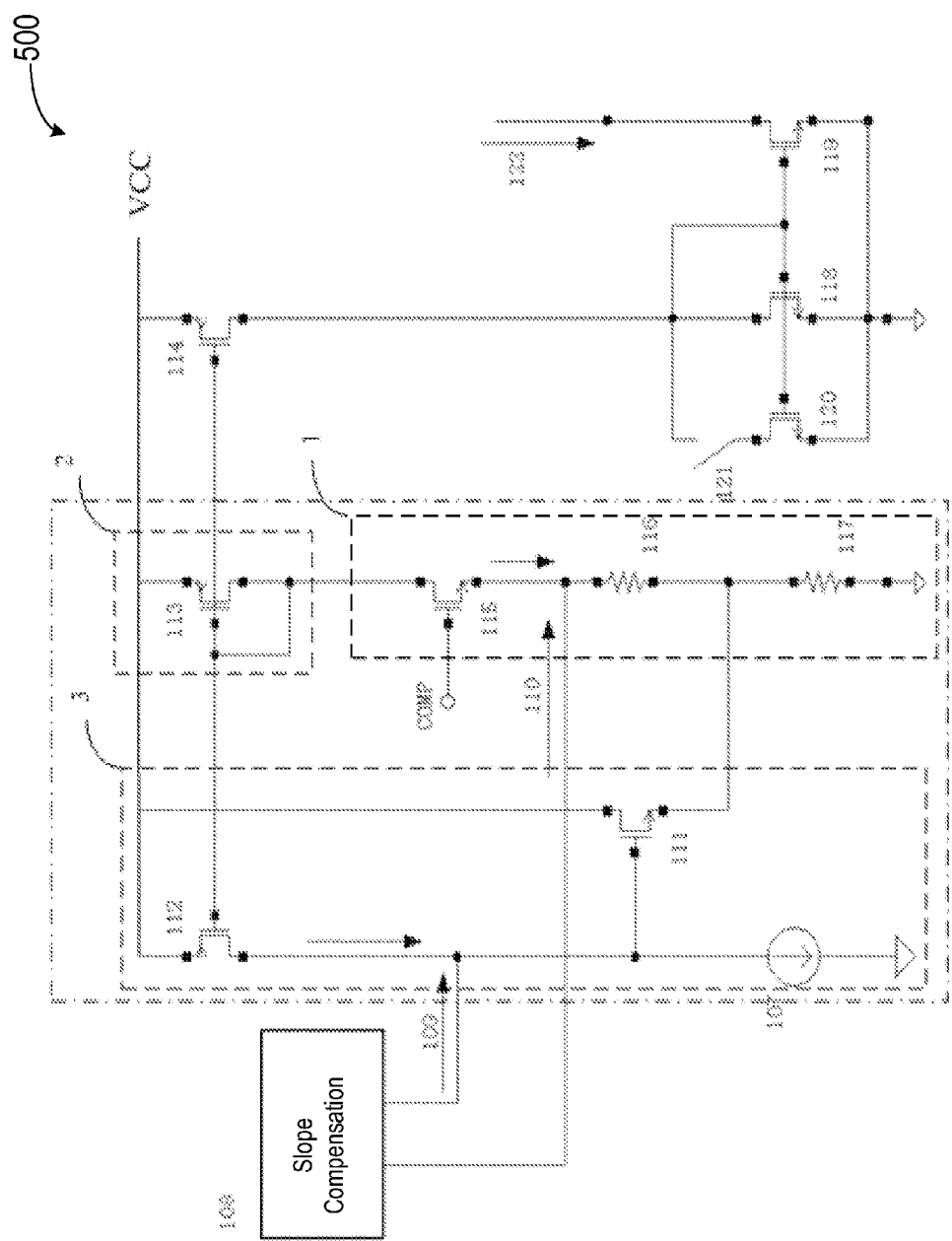
FIG. 5 is a simplified circuit diagram of a current control circuit according to another embodiment of the present invention.

FIG. 5 is a simplified circuit diagram of a current control circuit 500 according to another embodiment of the present invention. As shown, current control circuit 500 is similar to current control circuit 100, and includes the same components as current control circuit 100 which retain the same reference numerals. In addition, current control circuit 500 also includes a fifth NMOS transistor 120 and a first switch 121. The source terminal of transistor 120 is connected to the source terminal of the third NMOS transistor 118. The drain terminal of NMOS 120 is connected to first switch 121. A second terminal of switch 121 is connected to the drain terminal of NMOS 118. Transistor 120 and transistor 118 form a current mirror.

When the DC-DC converter is under test, switch 121 is closed, and transistor 120 are in a parallel connection with transistor 118. The current in transistor 119 is reduced. As a result, current 122 is reduced. Therefore, the current in inductor 105 is reduced during the testing. When the converter is not under testing, switch 121 is open. The inductor current not during testing can be calculated from the gains of transistors 118 and 120. For example, the inductor current with switch 121 open is equal to the inductor current with switch 121 closed multiplied by the sum of the gain of transistor 118 and the gain of transistor 120 divided by the gain of transistor 118.

Figure 6:
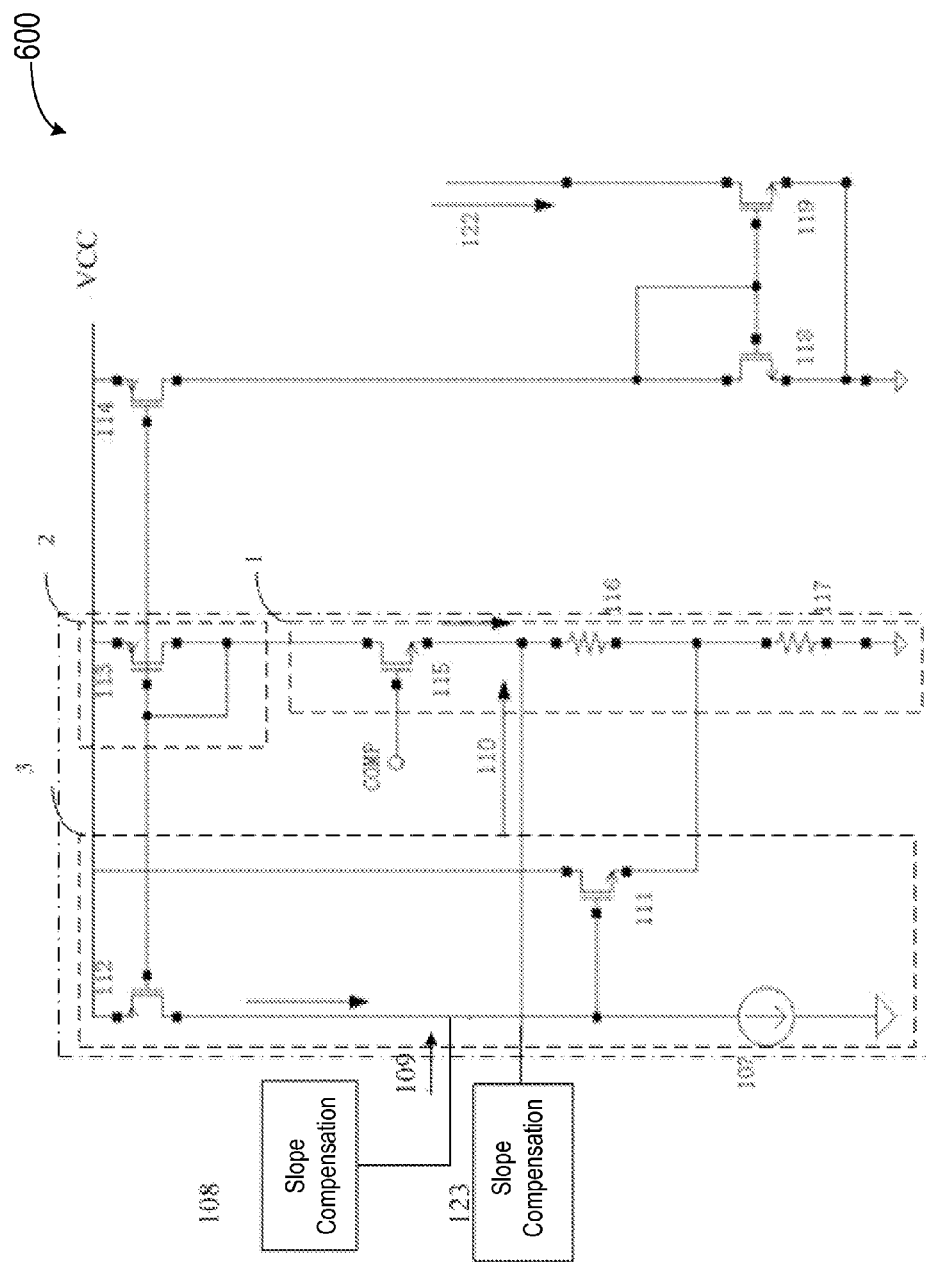
FIG. 6 is a simplified circuit diagram of a current control circuit according to another embodiment of the present invention.

FIG. 6 is a simplified circuit diagram of a current control circuit 600 according to another embodiment of the present invention. As shown, current control circuit 600 is similar to current control circuit 100, and includes the same components as current control circuit 100 which retain the same reference numerals. However, in current control circuit 100, the first and the second slope compensation currents are provided by the same slope compensation circuit. In contrast, in current control circuit 600, the second slope compensation current 109 is provided by a second slope compensation circuit 108. When a first slope compensation current in the first slope compensation circuit is at a peak value, a current in the second slope compensation circuit is also at a peak value. When a first slope compensation current is at a valley value, a second slope compensation current is at a valley value. In addition, at all times, a sum of the second slope compensation current and a drain current of the first PMOS is greater than a current from the voltage (power) source.

Figure 7:
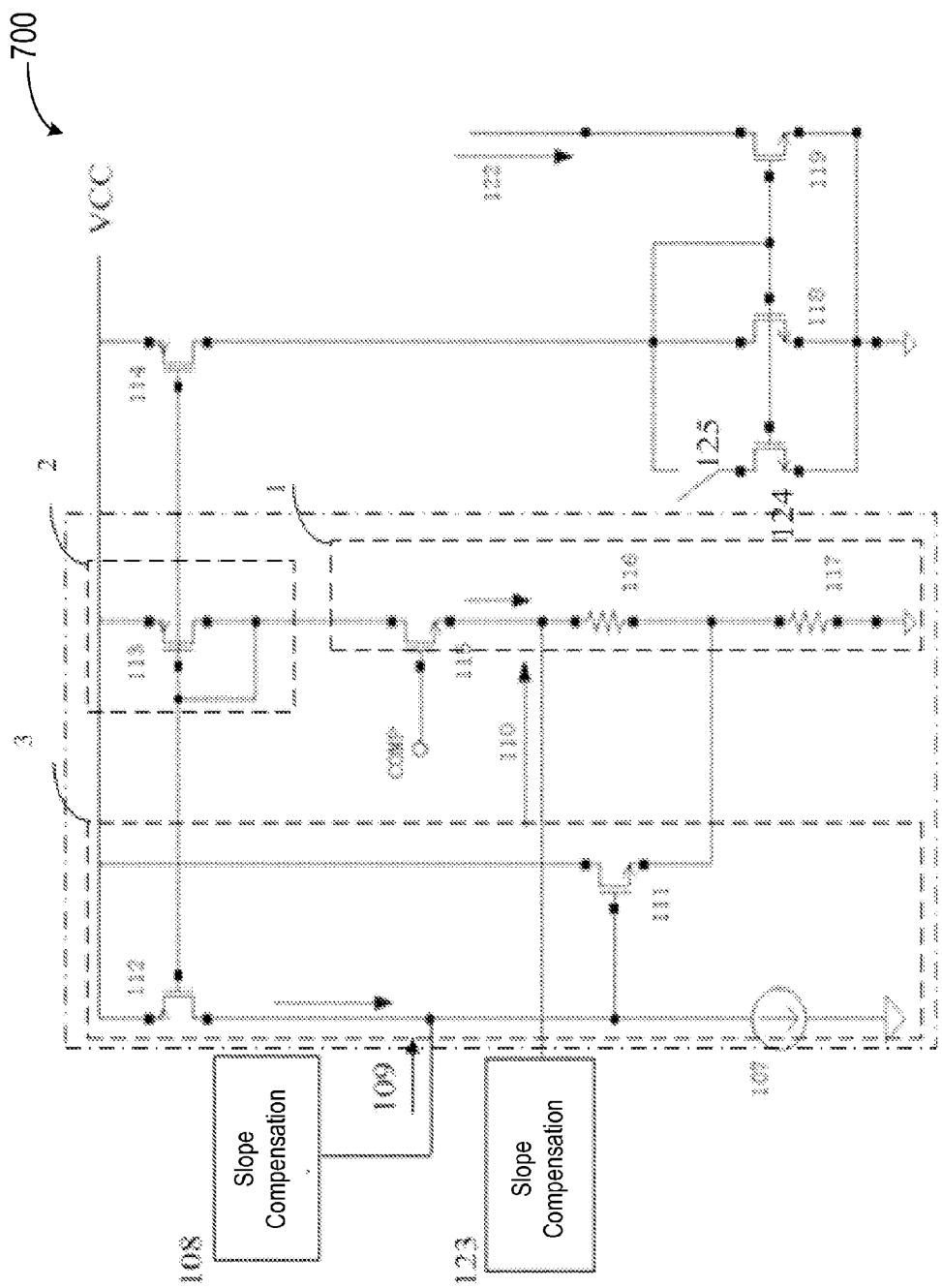
FIG. 7 is a simplified circuit diagram of a current control circuit according to another embodiment of the present invention.

FIG. 7 is a simplified circuit diagram of a current control circuit 700 according to another embodiment of the present invention. As shown, current control circuit 700 is similar to current control circuit 600, and includes the same components as current control circuit 600 which retain the same reference numerals. However, current control circuit 700 further includes a sixth NMOS transistor 124 and a second switch 125 connected in parallel with the third NMOS transistor 118. The function and operation of transistor 124 and switch 125 are similar to those of transistor 120 and switch 121. When the DC-DC converter is under test, switch 125 is closed, and transistor 124 are in a parallel connection with transistor 118. The current in transistor 119 is reduced. As a result, current 122 is reduced. Therefore, the current in inductor 105 is reduced during the testing. When the converter is not under testing, switch 125 is open. The inductor current not during testing can be calculated from the gains of transistors 118 and 124, as described above in connection with FIG. 5.

The above description is illustrative and not restrictive. Many variations of the invention will become apparent to those skilled in the art upon review of this disclosure. The scope of the invention should, therefore, not be limited the above description.

What is claimed is:

1. A current control circuit, comprising:
an input circuit for receiving an input signal;
an output circuit coupled to the input circuit to receive a current therefrom;
a feedback circuit coupled to the input circuit and the output circuit;
a voltage source coupled to the input circuit and the feedback circuit;
wherein:
the feedback circuit includes a first PMOS transistor and a current source connected in series, and a first NMOS transistor whose gate terminal is coupled to a node between the first PMOS transistor and the current source;
the output circuit includes a second PMOS transistor;
the input circuit includes a second NMOS transistor, a first resistor and a second resistor connected in series, a node between the first resistor and the second resistor is coupled to the first NMOS transistor of the feedback circuit;
a third PMOS transistor forming a first current mirror with the first PMOS transistor and the second PMOS transistor; and
a third NMOS transistor and a fourth NMOS transistor forming a second current mirror to receive a current from the third PMOS transistor and providing an output signal of the current control circuit;
a first slope compensation current coupled to a node between the second NMOS transistor and the first resistor in the input circuit; and
a second slope compensation current coupled to a node between the first PMOS transistor and the current source of the feedback circuit,
wherein the first slope compensation current and the second slope compensation current have the same phase and period, and a sum of the second slope compensation current and a drain current of the first PMOS is greater than a current from the current source.

2. The current control circuit of claim 1, further comprising a single slope compensation circuit configured to provide the first slope compensation current and the second slope compensation current.

3. The current control circuit of claim 1, further comprising a first slope compensation circuit configured to provide the first slope compensation current and a second slope compensation circuit configured to provide the second slope compensation current.

4. The current control circuit of claim 1, wherein when the first slope compensation current is at a peak value, the second slope compensation current is also at a peak value, and wherein when the first slope compensation current is at a valley value, the second slope compensation current is also at a valley value.

5. The current control circuit of claim 1, further comprising a first switch and a fifth NMOS transistor connected in series and forming a current mirror with the third NMOS transistor, wherein the first switch is configured to be closed when the current control circuit is under testing.

6. The current control circuit of claim 5, further comprising a single slope compensation circuit configured to provide the first slope compensation current and the second slope compensation current.

7. The current control circuit of claim 5, further comprising a first slope compensation circuit configured to provide the first slope compensation current and a second slope compensation circuit configured to provide the second slope compensation current.

8. A current control circuit, comprising:
an input circuit for receiving an input signal;
an output circuit for providing an output signal, the output circuit being coupled to the input circuit to receive a current therefrom;
a feedback circuit coupled to the input circuit and the output circuit to form a feedback loop formed by the input circuit, the output circuit, and the feedback circuit;
a first slope compensation current coupled to the input circuit for controlling the output signal, the first slope compensation current being a periodic current; and
a second slope compensation current coupled to input circuit through the feedback circuit,
wherein the second slope compensation current has the same phase and period as the first slope compensation current;
wherein:
the feedback circuit includes a first PMOS transistor and a current source connected in series, and a first NMOS transistor whose gate terminal is coupled to a node between the first PMOS transistor and the current source;
the output circuit includes a second PMOS transistor;
the input circuit includes a second NMOS transistor, a first resistor and a second resistor connected in series, a node between the first resistor and the second resistor is coupled to the first NMOS transistor of the feedback circuit; and
a sum of the second slope compensation current and a drain current of the first PMOS is greater than a current from the current source.

9. The current control circuit of claim 8, wherein the second slope compensation current has a magnitude selected to prevent overshoot in the output signal.

10. The current control circuit of claim 8, further comprising a first switch and a fifth NMOS transistor connected in series and forming a current mirror with the third NMOS transistor, wherein the first switch is configured to be closed when the current control circuit is under testing.

11. The current control circuit of claim 8, further comprising a single slope compensation circuit configured to provide the first slope compensation current and the second slope compensation current.

12. The current control circuit of claim 8, further comprising a first slope compensation circuit configured to provide the first slope compensation current and a second slope compensation circuit configured to provide the second slope compensation current.

13. A DC-DC converter comprising:
an input terminal for receiving an input power;
an output terminal for coupling to an inductor to provide an output voltage to a load device;
a first power transistor coupled to the input terminal and the output terminal;
an amplifier for receiving a signal from the load device;
a current control circuit coupled to the amplifier;

a comparator coupled to the current control circuit and the output terminal;

a driver circuit coupled to the comparator and the first power transistor;

a second power transistor coupled between the input terminal and the comparator;

wherein the current control circuit including:

an input circuit for receiving an input signal;

an output circuit for providing an output signal, the output circuit being coupled to the input circuit to receive a current therefrom;

a feedback circuit coupled to the input circuit and the output circuit to form a feedback loop formed by the input circuit, the output circuit, and the feedback circuit;

a first slope compensation current coupled to the input circuit for controlling the output signal, the first slope compensation current being a periodic current; and a second slope compensation current coupled to the input circuit through feedback circuit, wherein the second slope compensation current has the same phase and period as the first slope compensation current;

wherein:

the feedback circuit includes a first PMOS transistor and a current source connected in series, and a first NMOS transistor whose gate terminal is coupled to a node between the first PMOS transistor and the current source;

the output circuit includes a second PMOS transistor;

the input circuit includes a second NMOS transistor, a first resistor and a second resistor connected in series, a node between the first resistor and the second resistor is coupled to the first NMOS transistor of the feedback circuit; and a sum of the second slope compensation current and a drain current of the first PMOS is greater than a current from the current source.

14. The DC-DC converter of claim 13, wherein the second slope compensation current has a magnitude selected to prevent overshoot in the output signal.

15. The DC-DC converter of claim 13, further comprising a first slope compensation circuit configured to provide the first slope compensation current and a second slope compensation circuit configured to provide the second slope compensation current.

16. The DC-DC converter of claim 13, wherein the current control circuit further comprises a first slope compensation circuit configured to provide the first slope compensation current and the second slope compensation current.

17. The DC-DC converter of claim 13, wherein the current control circuit further comprises a switch configured to reduce an output current when the current control circuit is under testing.

* * * * *